UNITED STATES PATENT OFFICE.

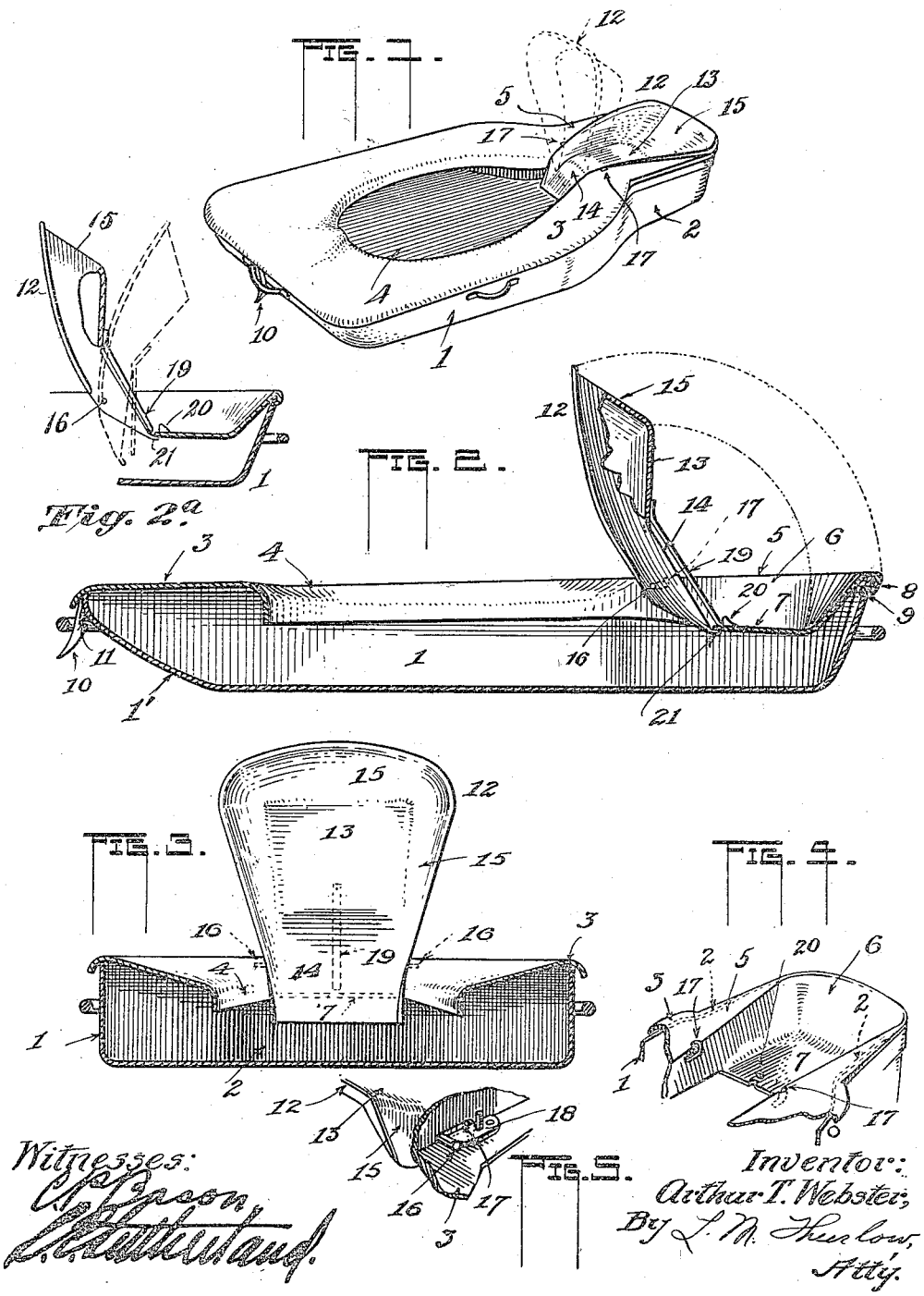

ARTHUR T. WEBSTER, OF PEORIA, ILLINOIS.

BED-PAN.

1,252,868.                    Specification of Letters Patent.        Patented Jan. 8, 1918.

Application filed June 16, 1915.   Serial No. 34,441.

*To all whom it may concern:*

Be it known that I, ARTHUR T. WEBSTER, citizen of the United States, residing at Peoria, in the county of Peoria and State of Illinois, have invented certain new and useful Improvements in Bed-Pans; and I do hereby declare that the following is a full, clear, and exact description of the invention, which will enable others skilled in the art to which it appertains to make and use the same.

This invention relates to an improvement in bed pans.

It has for one of its objects the provision of a simple form of bed pan that can be kept thoroughly sanitary in that the few parts of which it is composed can be readily separated when cleansing is necessary, in addition to which the parts have no corners that cannot be easily reached and cleansed.

Another object is to furnish a bed pan having a part that can be raised into position for deflecting the discharge downward into the pan, said part being adapted to fold down upon the pan so that the device as a whole will occupy the least amount of space and can be stored in a small space.

Beside the above objects the invention is directed to novel features of construction and arrangement of parts to be described herein aided by the accompanying drawing, in which, Figure 1 shows the pan in perspective in its collapsed position.

Fig. 2 is a longitudinal sectional elevation of the same.

Fig. 2ª is a similar view of a portion of the pan and a deflector thereon shown in two different positions, one of said positions being shown in dotted lines.

Fig. 3 is a cross section of the pan in elevation.

Fig. 4 shows a portion of the pan in perspective illustrating certain structural features; and, Fig. 5 shows the under side of a portion of a removable top of the pan and a pivoted deflector and certain structures in connection therewith.

1 represents a shallow receptacle of the required capacity, the main portion of which is of a rectangular form of outline as viewed in plan, one end of the said receptacle terminating in a narrow portion or neck 2 as indicated in Figs. 1 and 4.

As illustrated in Fig. 2 the receptacle is preferably beveled downward and inward at its broadest end 1' and, in addition, said receptacle is gradually decreased in the height of its sides from its end having the neck 2 toward its other end so that as it lies upon a level surface, for instance, the end having the said neck 2 will lie higher than the other.

3 indicates a top or cover portion to lie upon the open side or top of the receptacle, the same being removable therefrom. It is provided with the oval form of opening 4 usual in such devices, one end terminating in a narrow portion 5 to correspond with and overlie the neck 2 of said receptacle.

This portion 5 terminates in a recess 6 provided with a shelving bottom 7 to overhang the bottom of said receptacle 1 within the neck 2 as clearly illustrated in Fig. 2. The bottom is designed to prevent the upward splashing or loss outside of the pan of the discharge directed downward beneath it by the deflector. The said top is rounded and otherwise formed so as to fit the body of the patient in the most comfortable manner and at its narrow portion it is provided with a hook 8 whose end is bent inward toward the rearmost wall of the recess 6 as clearly shown and engages in a hole 9 in the rear wall of the neck 2, Fig. 2.

Beneath its opposite end the top 3 is provided with a spring catch 10 to engage beneath a keeper 11 extending from the wall of the pan. By means of the said hook and the catch the top may be thus secured to the receptacle but readily removed therefrom on occasion.

12 denotes, as a whole, a detachable deflector pivotally mounted on the top or cover 3 so as to be raised and lowered to the extreme positions indicated in Figs. 2 and 1 respectively. Its form is clearly shown in the several figures and it is adapted to nest in the recess 6 of the cover when closed down as in said Fig. 1. What may be termed its bottom when closed, or its rear wall when raised, is indicated by 13 which in the latter position faces the opening 4 of the cover and is designed to receive discharges against it from patients of either sex. It is noted that the lower portion of the said wall 13 in Fig. 2 slants downwardly and rearwardly at 14 toward the bottom of the receptacle 1 and the neck 2 thereof.

This slanted portion is at such an angle that discharges are directed downward and inward so that there will be no danger of such discharges being diverted outside the cover or receptacle to soil the bed linen or the garment of the patient. Moreover, the deflector is furnished with an outwardly flaring marginal wall 15 so that said deflector can be carried well up against the person and result in retaining the discharge within it. The said marginal walls at opposite sides are each provided with a trunnion 16 near the lower end each of which lies within a bayonet slot 17 in each inner downturned portion of the cover 3 best shown in Fig. 4.

It is observed that the trunnions are dropped into the open ends of the said slots and then carried forward into the closed extremities thereof, see Figs. 2 and 5 where they are held by means of a latch 18 pivoted to the underside of the cover each of which is brought behind the trunnions. This holds the latter securely in place but permits the deflector to readily pivot.

19 is a spring attached at one end to the rear side of the deflector while its free end when the latter is raised will just pass over the edge of the bottom 7 of the cover, where it engages behind a stop or lug 20 on the top surface of said bottom near said edge.

This structure serves to prevent the deflector moving toward its closed position. The latter is prevented swinging forward from its proper upright position by being furnished with a projecting lip 21 which engages beneath the edge of the said bottom 7 as shown.

In raising the deflector to position for use the spring 19 passes the edge of 7 and engages behind the stop or lug 20 said deflector being held rigidly in the upright position aided by the lip 21.

As seen in Fig. 2, the deflector is raised on its trunnions to its upright position. Its weight while lying forward of its trunnions cannot cause it to fall forward into the pan because the lip 21 engages beneath the part 7.

The spring 19 because of its normal tendency is held away from the deflector and will therefore lie against the lug 20. Thus said spring which is stiff acts as a prop so that the deflector is held from moving rearward to its reclining position.

It is only when the spring is moved against the deflector so as to carry its end over the edge of the part 7 that the said deflector can be lowered.

There is just sufficient support between the edge of said part 7 and the lug, see Fig. 4, to permit lodgment for the end of the spring, the deflector in its extreme forward position permitting free swing of the spring past said edge. That is to say, the end of the spring in swinging just clears said edge. While reclining, the spring lies against the deflector because of the weight of the latter thereon, the end of said spring resting upon the lug. Fig. 2ª shows the position of the spring 19 when moved against the deflector to permit the latter to be lowered upon the pan to the position shown in Fig. 1. In thus moving the spring it clears the edge of the part 7 whereupon the deflector is free to lower.

The method of mounting the deflector shown and described is one that is convenient and fills every need, the whole purpose being that the deflector can be lowered and placed flat upon the pan when not in use so that the device can be stored in the least amount of space, but raised and secured in position, when needed, my structure being distinguished by the fact that the deflector can be raised on its hinge to position for use and secured in that position from movement in either direction and until released.

The gradually decreasing height of the pan toward the rear or large end makes for convenience in that it can be more easily slipped beneath the patient and also that it provides greater comfort in the reclining position of the patient.

The pan in being beveled or undercut at its rear end besides being reduced in height toward that end permits it to readily sink into the mattress and provide the greatest comfort possible.

As can be seen, the parts of my device can be readily separated for a thorough cleansing and airing which is greatly to be desired.

Having thus described the invention, I claim:—

1. In combination with the body of a bed pan, of a deflector for the same pivotally mounted at one end thereon and adapted for adjustment to two extreme positions, one of such positions being an elevated one, and means at the rear side of said deflector to engage the pan for positively securing the same in said elevated position.

2. In a device for the purposes described, the combination of a pan or receptacle having a top portion, a raisable deflector portion pivotally mounted upon the said top portion and adapted to be adjusted to two extreme positions, and means on one of the portions to automatically engage the other portion when the said raisable deflector portion is lifted holding said deflector portion in its raised position.

3. In a device for the purposes described, the combination of a pan or receptacle having a top portion, a deflector pivotally mounted upon the said top and adapted to be adjusted to two extreme positions, one of said positions being an elevated one, said deflector when in its elevated position being substantially perpendicular to the plane of the pan or receptacle, and means at the rear side of the deflector to hold said deflector in the elevated position when raised.

4. In a device for the purposes described, the combination of a pan or receptacle having a top portion, a deflector pivotally mounted upon the said top and adapted to be adjusted to two extreme positions, one of said positions being an elevated one, said deflector when in its elevated position being substantially perpendicular to the plane of the pan or receptacle, and means to automatically take a position and hold said deflector in the elevated position when raised.

5. In a device for the purposes described, the combination of a pan or receptacle, a deflector mounted in a pivotal manner with respect to the same near the end, and adapted in one of its positions to lie upon the pan and adapted in another position to stand substantially upright, a portion of its bottom in said upright position slanting downward and rearward toward the end of the pan in which it is pivoted, and means to support the deflector in its perpendicular position.

6. In a device for the purposes described, the combination of a pan or receptacle including a top or cover, a deflector pivoted on the latter near one end and adapted to move on its pivot from a reclining position on said top to an upright position, said deflector including a wall at its rear when in its elevated position and having a portion of its wall inclined downward toward that end of the pan in which it is pivoted, and means to hold the latter in its upright position.

7. In a device for the purposes described, the combination of a pan or receptacle including a top or cover, a deflector pivoted on the latter near one end and adapted to move on its pivot from a reclining position on said top to an upright position, said deflector including a wall at its rear when in its elevated position and having a portion of its wall inclined downward toward that end of the pan in which it is pivoted, said wall having a flaring marginal flange extending toward that end of the pan opposite that in which the deflector is pivoted, and means to hold the deflector in its upright position.

8. The combination with the body of a bed pan, having a pair of oppositely disposed open-end recesses in its top portion near one end, a deflector having a trunnion extending from each of two opposite sides thereof adapted to be removably seated in said recesses, said deflector adapted to be moved on said trunnions in a pivotal manner to two extreme positions, one of said positions being an elevated one, and means to secure said deflector positively in its elevated position.

9. In a device for the purposes described, the combination of a pan or receptacle including a top or cover overlying the said pan or receptacle and having an opening gradually contracted at one end of the said top or cover to form a narrow recess, and a deflector provided with trunnions, there being a recess in the cover at each side of the first described recess to receive the trunnions, the deflector adapted to have an upright position in said lid or cover.

In testimony whereof I affix my signature in presence of two witnesses.

ARTHUR T. WEBSTER.

Witnesses:
W. I. SLEMMONS,
L. M. THURLOW.

Copies of this patent may be obtained for five cents each, by addressing the "Commissioner of Patents, Washington, D. C."